Figure 1:
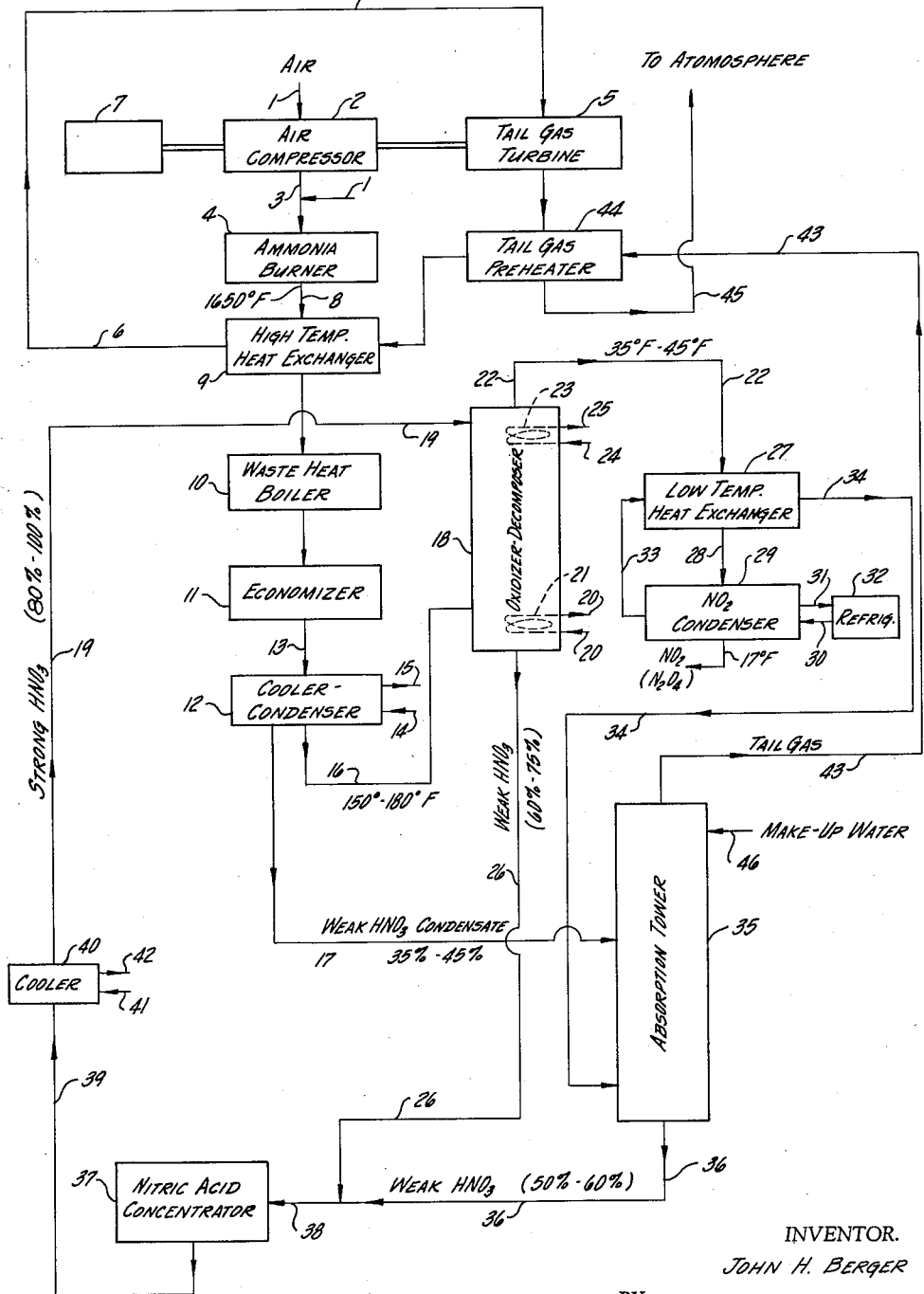

June 9, 1964 J. H. BERGER 3,136,602
PRODUCTION OF NITROGEN DIOXIDE
Filed July 10, 1961

INVENTOR.
JOHN H. BERGER
BY Bosworth, Sessions,
Herrstrom & Knowles
ATTORNEYS

United States Patent Office 3,136,602
Patented June 9, 1964

3,136,602
PRODUCTION OF NITROGEN DIOXIDE
John H. Berger, White Plains, N.Y., assignor to Arthur
G. McKee & Company, Cleveland, Ohio, a corporation
of Delaware
Filed July 10, 1961, Ser. No. 122,728
2 Claims. (Cl. 23—162)

This invention relates to the production of nitrogen oxides and more particularly to an improved process for making nitrogen dioxide ($NO_2$) and/or its dimer nitrogen tetroxide ($N_2O_4$) which are deemed to be the same compound for purposes of this invention.

Nitrogen dioxide is a strong oxidizing agent which may be maintained in the liquid state at relatively high temperatures. It is becoming more and more important as a commercial product, particularly as an oxidant for high energy fuels for rocket propulsion or the like. Various procedures for making nitrogen dioxide have been proposed which start with the burning of ammonia in air in the presence of a catalyzer as commonly practiced in the production of nitric acid. The reaction that occurs in these catalytic burners is: $4NH_3+5O_2=4NO+6H_2O$. The gas leaving the ammonia burner is at a relatively high temperature (about 1650° F.) and a part of the NO is oxidized into $NO_2$ by the excess oxygen in the gas discharged from the ammonia burner. As indicated above, water is formed in the ammonia burner and as $NO_2$ will combine with water to form nitric acid ($3NO_2+H_2O=2HNO_3+NO$), a certain portion of the $NO_2$ will be consumed in making weak nitric acid.

It is an object of the present procedure to produce a maximum quantity of $NO_2$ from the output of a conventional ammonia burner. A further object is the provision of a method for the production of $NO_2$ whereby a relatively large yield of $NO_2$ may be obtained from a conventional nitric acid plant with relatively minor modifications.

The above and other objects of my invention will appear from the following description of my improved process, reference being had to the attached drawing in which:

FIGURE 1 is a flow sheet diagrammatically representing apparatus which may be used in carrying out my process and indicating the flow of materials therethrough.

Generally speaking my invention contemplates converting substantially all of the weak nitric acid that is produced as a result of burning ammonia in a catalytic burner into $NO_2$ (it being understood that where reference is made to nitrogen dioxide, $NO_2$, in this specification and the attached claims, it is intended also to include nitrogen tetroxide, $N_2O_4$, and vice versa). This is accomplished by concentrating the weak nitric acid to strong (80%–100%) nitric acid, suitably controlling the temperature of the gases leaving the cooler-condenser of a conventional catalytic burner nitric acid plant to retard the oxidation of NO to $NO_2$ so that a predetermined desired ratio of NO to $NO_2$ is obtained at this point, and then passing the gaseous output from the cooler-condenser, with its predetermined ratio of NO to $NO_2$, countercurrent to a stream of strong nitric acid in an oxidizer-decomposer unit under conditions such that the normal absorption reaction ($3NO_2+H_2O=2HNO_3+NO$) is reversed whereby all of the original NO is oxidized to $NO_2$ and $HNO_3$ is decomposed to form additional $NO_2$, thus substantially enriching the $NO_2$ content of the gaseous output of the oxidizer-decomposer unit. The weak nitric acid that remains after this last reaction is withdrawn from the oxidizer-decomposer unit and, together with the weak acid which is formed in other parts of the process as will be later described, is subjected to concentration in any suitable and well-known manner into strong (80%–100%) nitric acid which is then cooled and utilized in the above referred to conversion of the NO into $NO_2$.

One particular procedure in accordance with my process will now be more specifically described with reference to the flow diagram of FIGURE 1, it being understood that this illustrates only one particular manner of carrying out my invention. Conventional equipment such as pumps, valves, etc. have not been included in the drawing but would, of course, be installed where and as necessary. Furthermore, although certain temperature conditions are referred to on the drawing and in the following description, it is to be understood that these are approximate and may vary considerably in actual practice of the invention.

Ammonia ($NH_3$) enters the system through the line 1 and is delivered, along with air from the compressor 2, through the line 3 to the ammonia burner 4. As illustrated, the compressor 2 is driven by a turbine 5 actuated by heated tail gas from the system which is delivered to the turbine through line 6. An electric motor or other suitable prime mover 7 may also be connected to drive the compressor 2 in case sufficient power is not available from the tail gas turbine 5.

The ammonia burner 4 may be of the well-known catalytic type in which ammonia is oxidized into NO and $H_2O$ according to the reaction set forth above and these are delivered in gaseous form, together with the other products of the combustion (nitrogen, oxygen and additional water of combustion) through line 8 at a temperature of approximately 1650° F. Some of the heat from this gas is given up to the tail gas in the high temperature heat exchanger 9 and the gases then may continue through waste heat boiler 10 and economizer 11 which utilize the heat in the output of the ammonia burner to generate steam for any purpose.

After leaving the economizer 11 the gaseous products pass to the cooler-condenser unit 12 through line 13. A coolant, such as water, is circulated through the cooler-condenser 12 by lines 14 and 15 and the temperature of the gases leaving unit 12 is so controlled that the oxidation of NO to $NO_2$, which occurs due to the excess of oxygen in the gases leaving the ammonia burner 4, is retarded to a point where the ratio of NO to $NO_2$ in the line 16 leaving the cooler-condenser 12 is approximately one to one. There will also be produced in the cooler-condenser unit 12 a certain amount of weak nitric acid condensate (approximately 35%–45% $HNO_3$) due to combination of $NO_2$ with water and this is discharged through the line 17.

The temperature of the gas discharged through line 16 is approximately 150° F.–180° F. and it will be understood that this gas, in addition to approximately equal parts of NO and $NO_2$, will contain a certain amount of water, nitrogen and oxygen. This is discharged into the oxidizer-decomposer unit 18 where it passes upwardly in countercurrent relation to strong nitric acid (80%–100%) delivered to unit 18 through line 19 from a source to be later described and at a temperature of approximately 35° F.–40° F. The unit 18 may be any suitable countercurrent gas and liquid contact apparatus such as a bubble cap column of the type used in conventional absorption towers.

In this oxidizer-decomposer unit 18 the normal absorption reaction for the production of nitric acid is reversed as previously explained, and the NO combines with the strong nitric acid with the resulting formation of $NO_2$ and water. In addition, the downcoming stream of strong nitric acid dehydrates the rising stream of gas so that the water content of the gases leaving the oxidizer-decomposer 18 is reduced practically to zero.

As this reaction whereby the NO is changed to $NO_2$ is endothermic, heat is supplied at the bottom of unit 18 as by passing steam or hot water through lines 20 and 20' and the heating coil 21. The gaseous products which leave the unit 18 through line 22 are maintained preferably at about 35° F.–45° F. and a cooling coil 23, through which cooling water may be passed by lines 24 and 25, assists in maintaining this temperature. This cooling at the top of tower 18 is effective to minimize the vapor pressure of the $HNO_3$ and water at this point and thereby keep as low as practical the $HNO_3$ and water vapor content of the oxidized gas leaving the oxidizer-decomposer 18. The gas leaving unit 18 through line 22 consists essentially of $NO_2$, nitrogen, oxygen, and small quantities of $HNO_3$. A weak nitric acid (approximately 60%–75%) will be discharged from the bottom of unit 18 through line 26.

The cool $NO_2$ in line 22 passes through the low temperature heat exchanger 27 and through line 28 to the $NO_2$ condenser 29. This condenser is cooled by circulating a cooling fluid through lines 30 and 31, a refrigeration unit 32 being used to maintain the desired temperature in the cooling fluid. The condensate from condenser 29 is substantially entirely $NO_2$ and the uncondensed residual gas leaves the condenser 29 through line 33. As the condenser 29 operates at a temperature of about 17° F. the gas in line 33 will be at this temperature and it is preliminarily heated to a limited extent by passing through the low temperature heat exchanger 27 where heat is extracted from the materials entering the condenser 29. This residual gas leaves the heat exchanger 27 through line 34 and consists primarily of nitrogen, oxygen and a small amount of $NO_2$. The line 34 enters the absorption tower 35 where it passes in countercurrent contact with weak nitric acid brought from the cooler-condenser 12 by line 17. In the tower 35 any $NO_2$ in the residual gas leaving the condenser 29 combines with the condensate from cooler-condenser 12 to produce additional weak nitric acid so that the liquid discharged from the bottom of tower 35 through line 36 is approximately 50%–60% nitric acid.

Weak nitric acid from the oxidizer-decomposer unit 18 is carried by line 26 and combined with that from the absorption tower 35 and discharged into the nitric acid concentrator 35 through line 38. This nitric acid concentrator may be of any conventional type wherein weak nitric acid is converted into strong (80%–100%) nitric acid and is well-known in the art. The strong acid output from the concentrator 37 is carried through line 39 to a cooler 40, which may be supplied with a liquid coolant through lines 41 and 42, where it is cooled to approximately 35°–40° F. The tail gas which is taken off from the top of the tower 35 by line 43 passes through a tail gas preheater unit 44, where it absorbs heat from the exhaust from the turbine 5, and then through the high temperature heat exchanger 9 where it picks up sufficient heat energy to drive the turbine 5. After passing through the tail gas preheater 44 the turbine exhaust gas may be conducted to atmosphere through line 45.

With the above procedure, if not more than about 50% of the NO in the gases leaving the cooler-condenser unit 12 have been oxidized to $NO_2$, the weak nitric acid which is produced in the cooler-condenser unit 12, in the oxidizer-decomposer unit 18 and in the absorption tower 35 will be substantially entirely consumed in the reversed or decomposing reaction in the oxidizer-decomposer where the NO is converted to $NO_2$ and water. Make up water may be added to the absorption tower 35 through line 46 as required but, as the weak nitric acid that is formed in the process is continuously concentrated, recycled and consumed, there is in my process no substantial excess production of weak nitric acid to reduce the output of the desired $NO_2$ and which would have to be disposed of.

While the one to one ratio of NO to $NO_2$ referred to above is the approximate optimum ratio which can be obtained in ammonia burning systems operating at approximately eight atmospheres pressure, burning and condensation at lower pressures will produce gases leaving the cooler-condenser which have higher ratios of NO to $NO_2$. Such lower pressure operation, and consequent higher ratio of NO to $NO_2$, would require a quantity of concentrated nitric acid for oxidizing the NO greater than can be produced from the weak acid output of the cooler-condenser and the absorption tower. Since any additional concentrated nitric acid thus required can be supplied from conventional sources and would be decomposed to $NO_2$, ratios of NO to $NO_2$ greater than one to one can be utilized in my process.

Furthermore, if the NO to $NO_2$ ratio is less than one to one, some weak nitric acid will be produced in excess of the quantity required for oxidation of the NO. Since in some instances it may be desirable to produce such excess quantities of weak nitric acid, it is understood that my process may also be operated with ratios of NO to $NO_2$ less than one to one.

From the above description it will be understood that my improved process results in the production of nitrogen dioxide without the production of a quantity of nitric acid which must be disposed of and which would reduce the output of nitrogen dioxide. It will further be understood that, although I have described a particular sequence of operations and a particular arrangement of apparatus for carrying out my process, modifications and variations may be made therein, in the conditions under which the various steps are carried out, and in the sequence of the steps, without departing from the spirit of my invention. I do not, therefore, wish to be limited to the exact procedures herein illustrated and described but claim as my invention all embodiments thereof coming within the scope of the appended claims.

I claim:

1. In the production of nitrogen dioxide from the oxidation of ammonia to a mixture of nitric oxide and water and the subsequent conversion of nitric oxide to nitrogen dioxide, the steps of cooling the products of oxidation of the ammonia and condensing therefrom 35%–45% nitric acid by maintaining the temperature of the condensing step at from about 150° F. to about 180° F. so that the ratio of nitric oxide to nitrogen dioxide in the mixture of gas leaving the condensing step is approximately one-to-one, withdrawing said 35%–45% nitric acid, passing said mixture of gas in contact with 80%–100% nitric acid at a temperature of approximately 35° F.–40° F. whereby the nitric oxide in said mixture of gas and said nitric acid oxidize and decompose to form nitrogen dioxide and water according to the equation $NO + 2HNO_3 = 3NO_2 + H_2O$ and 55%–75% nitric acid, and condensing and withdrawing substantially all of said nitrogen dioxide as a product.

2. In the production of nitrogen dioxide from the oxidation of ammonia to a mixture of nitric oxide and water and the subsequent conversion of nitric oxide to nitrogen dioxide, the steps of cooling the products of oxidation of the ammonia and condensing therefrom 35%–45% nitric acid by maintaining the temperature of the condensing step at from about 150° F. to about 180° F. so that the ratio of nitric oxide to nitrogen dioxide in the mixture of gas leaving the condensing step is approximately one-to-one, withdrawing said 35%–45% nitric acid, passing said mixture of gas in contact with 80%–100% nitric acid at a temperature of approximately 35° F.–40° F. whereby the nitric oxide in said mixture of gas and said nitric acid oxidize and decompose to form nitrogen dioxide and water according to the equation $NO+2HNO_3=3NO_2+H_2O$ and 55%–75% nitric acid, condensing and withdrawing substantially all of said nitrogen dioxide as a product, withdrawing said 55%–75% nitric acid which remains from said oxidizing and decomposing step, concentrating the 35%–45% nitric acid withdrawn from the condensing step and 55%–75% nitric acid withdrawn from the oxidizing and decomposing step to form 80%–100% nitric acid, and returning and utilizing said so-formed 80%–100% nitric acid in the oxidizing and decomposing step.

References Cited in the file of this patent

UNITED STATES PATENTS

| | | |
|---|---|---|
| 1,901,816 | Luscher | Mar. 14, 1933 |
| 1,989,267 | Caro | Jan. 29, 1935 |
| 2,098,953 | Christensen | Nov. 16, 1937 |
| 2,123,467 | Hobler | July 12, 1938 |
| 2,128,527 | Fischer | Aug. 30, 1938 |
| 3,063,804 | Morrow | Nov. 13, 1962 |